Figures 1, 2, 3:
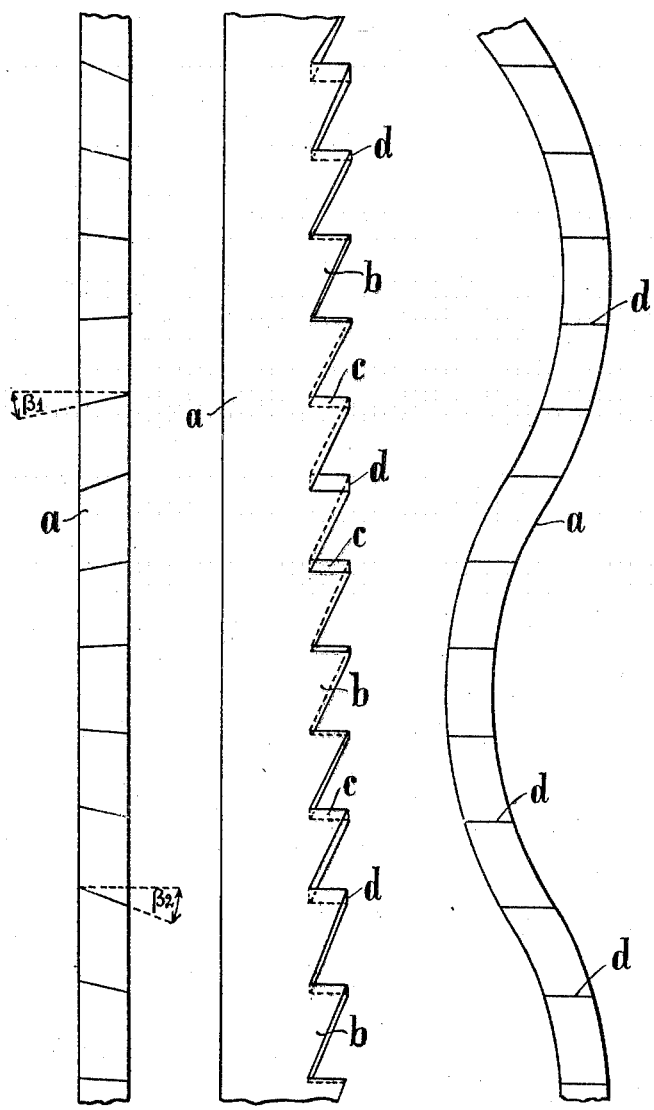

Oct. 22, 1929. A. PEISELER 1,732,692
METHOD FOR THE PRODUCTION OF SAW BLADES
Filed Feb. 28, 1929

Patented Oct. 22, 1929

1,732,692

UNITED STATES PATENT OFFICE

ALFRED PEISELER, OF REMSCHEID-HADDENBACH, GERMANY

METHOD FOR THE PRODUCTION OF SAW BLADES

Application filed February 28, 1929, Serial No. 343,278, and in Germany May 15, 1926.

In the manufacture of metal saw-blades it has been suggested, for the purpose of preventing resonance vibrations, to arrange the cutting surfaces of the teeth in an inclined position to the lateral surfaces of the sawblade.

The present invention relates to a method which renders it possible to produce such sawblades in a specially simple and economic manner by the use of a milling cutter in a single continuous working operation. The new method essentially consists in that the saw-blade blanks are held curved in the form of a wave line and are then, whilst in this curved state, provided with teeth by means of a milling cutter, in such a manner that the cutting edges of all the teeth are perpendicular to the saw blade blank before it was curved, whereby, upon straightening the sawblade thus produced, the teeth are disposed in groups so that the cutting edges of each group are inclined in the opposite direction to the cutting edges of the adjacent groups, the inclination of the cutting edges of the teeth in each group progressively increasing. This arrangement of the teeth of the sawblade will effectually prevent resonance vibrations of the blade in use.

Figs. 1 and 2 of the drawing represent a saw-blade produced in accordance with the new method, in edge view and in side view, respectively, whilst Fig. 3 illustrates, on a greatly enlarged scale, an edge view of a part of a saw-blade blank curved in wave-fashion for the purpose of milling the teeth.

The example represented is a metal sawblade $a$ with triangular teeth $b$, the cutting surfaces $c$ of which are situated at a right angle to the common plane of the edges of the teeth. It is obvious, of course, that the invention is also applicable to saw-blades in which the cutting surfaces are inclined in a forward direction, that is to say, to sawblades with undercut teeth.

In carrying out the production of sawblades in accordance with the new method a number of saw-blade blanks are clamped between two jaws which hold the blank in a sinuously curved or wavy line while the teeth are cut by means of a milling cutter. This clamping of the saw-blade blanks in the form of a wave-line curve is attained in the most simple manner by arranging the working surfaces of the clamping jaws in a wavy form and not straight, as hitherto. The sawblade blanks held in sinuous form (Fig. 3) and cut by the milling cutter are so provided with teeth that the cutting surfaces of the teeth of each blank are all parallel to each other and perpendicular to the blank before it was curved. Upon the termination of the milling operation, the saw-blades so produced are released from the jaws and straightened again. The cutting surfaces $c$ of the saw-teeth $b$ will then, as seen from Fig. 1, be arranged in alternating groups of a plurality of teeth to each group and the cutting edges of which groups are inclined respectively to the right and to the left of the lateral surfaces of the straight saw-blade. The angles of inclination $B_1$ and $B_2$ of the cutting surfaces of the teeth of the groups are, of course, not identical with all teeth of a group, but larger or smaller, according to the part of the wave line at which the tooth was positioned when milling the saw blade blank, and the angles of inclination of the cutting edges of the teeth of each group progressively increase from tooth to tooth of a group. If the saw-blades possess a sufficient elasticity prior to being hardened, a special straightening will not be required, in view of the fact that the saw-blades will automatically assume their normal straight form again.

The clamping of the saw-blades in a wavy state possesses an additional advantage in that a larger number of blades than before may be clamped and simultaneously milled.

Having thus described my invention, I claim:

The method of producing a saw-blade having groups of teeth, the cutting edges of each group being inclined in opposite directions to those of adjacent groups, which consists in bending a saw blade blank into a sinuously curved or wavy form, cutting teeth along the edge of the blank in such a manner that the cutting edges of all the teeth are perpendicular to the said blank before it was curved, and thereafter straightening out the blank.

In testimony whereof I affix my signature.

ALFRED PEISELER.